United States Patent
Kro et al.

(10) Patent No.: US 7,095,194 B2
(45) Date of Patent: Aug. 22, 2006

(54) METHOD FOR OPERATING AN ELECTRONICALLY COMMUTATED (EC) MOTOR

(75) Inventors: Sven-Jostein Kro, Ottersweier (DE); Reinhard Berger, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 11 days.

(21) Appl. No.: 11/177,667

(22) Filed: Jul. 8, 2005

(65) Prior Publication Data

US 2006/0006822 A1 Jan. 12, 2006

(30) Foreign Application Priority Data

Jul. 10, 2004 (DE) ............... 10 2004 033 404

(51) Int. Cl.
*H02P 7/06* (2006.01)
(52) U.S. Cl. ............... 318/254; 318/439; 318/138; 318/803
(58) Field of Classification Search ............... 318/245, 318/254, 138, 139, 439, 803, 599, 811; 388/804; 361/23–32
See application file for complete search history.

(56) References Cited

U.S. PATENT DOCUMENTS

| | | | | |
|---|---|---|---|---|
| 4,963,800 | A * | 10/1990 | Kajiwara et al. | 318/254 |
| 6,452,349 | B1 * | 9/2002 | Hahn et al. | 318/254 |
| 6,967,459 | B1 * | 11/2005 | Hahn et al. | 318/599 |
| 2004/0081438 | A1 * | 4/2004 | Hahn et al. | 388/804 |
| 2005/0018371 | A1 * | 1/2005 | Mladenik et al. | 361/78 |
| 2005/0241875 | A1 * | 11/2005 | Ta et al. | 180/443 |

FOREIGN PATENT DOCUMENTS

| | | |
|---|---|---|
| EP | 0780964 | 6/1997 |
| EP | 1016852 | 7/2000 |
| JP | 57175211 | 10/1982 |
| JP | 2000060177 | 2/2000 |

* cited by examiner

*Primary Examiner*—Paul Ip
(74) *Attorney, Agent, or Firm*—Simpson & Simpson, PLLC

(57) ABSTRACT

In a method for operating an electronically commutated (EC) motor that has a primary part having a coil and a secondary part having magnet segments, a measuring sequence is determined that has a plurality of measured value combinations, which are a function of the relative position between secondary part and primary part and each of which includes a number of measured values that corresponds to the number of magnetic fields sensors that are used for the determination. The coil is supplied with power as a function of the measured value combinations. The absolute position of the secondary part is determined by positioning of the secondary part at a reference position and by an absolute position value being tracked at each change of the measured value combination starting from a reference position value. For a relative movement between the secondary part and the primary part oriented in a prescribed direction, a reference sequence is determined and stored in memory that comprises a plurality of setpoint value combinations to be cycled through in succession and has a number of setpoint values corresponding to the number of magnetic field sensors. Based on the reference sequence of the measured value combination that occurred at the reference position and the number of changes in the measured value combination that occurred, the setpoint value combination is determined and compared to the measured value combination determined for the relevant absolute position value. When a deviation occurs, a fault condition is detected.

11 Claims, 7 Drawing Sheets

| Reference Sequence ||||
|---|---|---|---|---|
| Index | Setpoint Value Combination | Setpoint Value Sensor H3 | Setpoint Value Sensor H2 | Setpoint Value Sensor H1 |
| 0 | 5 | 0 | 0 | 1 |
| 1 | 1 | 0 | 1 | 1 |
| 2 | 3 | 0 | 1 | 0 |
| 3 | 2 | 1 | 1 | 0 |
| 4 | 6 | 1 | 0 | 0 |
| 5 | 4 | 1 | 0 | 1 |

Fig. 2

| Absolute Position Value | Index | Setpoint Value Combination | Measured Value Combination | Fault Condition Value |
|---|---|---|---|---|
| -1. Reference Run - |||||
| 0000 | 0 | 5 | 5 | 0 |
| 0001 | 1 | 1 | 1 | 0 |
| 0002 | 2 | 3 | 3 | 0 |
| 0003 | 3 | 2 | 2 | 0 |
| ⋮ | ⋮ | ⋮ | ⋮ | ⋮ |
| 2836 | 4 | 6 | 6 | 0 |
| 2837 | 5 | 4 | 4 | 0 |
| -1. Reset - |||||
| 2837 | 5 | 4 | 4 | 0 |
| 2838 | 0 | 5 | 5 | 0 |
| 2839 | 1 | 1 | 1 | 0 |
| ⋮ | ⋮ | ⋮ | ⋮ | ⋮ |
| 6003 | 3 | 2 | 2 | 0 |
| 6004 | 4 | 6 | 6 | 0 |
| -2. Reset - |||||
| 6004 | 4 | 6 | 5 | 1 |
| -2. Reference Run - |||||
| 0000 | 0 | 5 | 5 | 0 |
| 0001 | 1 | 1 | 1 | 0 |
| 0002 | 2 | 3 | 3 | 0 |
| 0003 | 3 | 2 | 2 | 0 |

Fig. 3

METHOD FOR OPERATING AN ELECTRONICALLY COMMUTATED (EC) MOTOR

CROSS-REFERENCE TO RELATED APPLICATIONS

This application claims priority of German Patent Application No. 10 2004 033 404.8, filed Jul. 10, 2004, which application is incorporated herein by reference.

FIELD OF THE INVENTION

The invention relates to a method for operating an EC motor (a brushless, electronically commutated motor, driven by DC, AC or pulse width modulated) that has a primary part having a coil and a secondary part having magnet segments that are alternately magnetized in opposite directions to each other, a measuring sequence is determined that has a plurality of measured value combinations that are a function of the relative position between secondary part and primary part and each comprise a number of measured values that correspond to the number of magnetic field sensors used for the determination that are mounted on the primary part and cooperate with the magnet segments, and the coil being supplied current as a function of the measured value combinations in such a manner that the secondary part moves relative to the primary part, the absolute position of the secondary part being determined relative to the primary part via positioning of the secondary part at a reference position and an absolute position value being tracked, starting from a reference position value, at each change of the measured value combination.

BACKGROUND OF THE INVENTION

A method of this type is known from experience. In this context Hall sensors—whose measuring signals are utilized on the one hand for the electronic commutation of the coil of the EC motor and on the other hand also for the measurement of the absolute position that the secondary part has relative to the primary part—are used as magnetic field sensors. As a result it is possible to do without an additional absolute value sensor. For determination of the absolute position, a reference position having a known absolute position is first approached. The reference position may, for example, be a limit stop against which the secondary part is positioned during a reference run. At the reference position, the absolute position value is set to the corresponding reference position value, which may have, for example, the value zero. Thereafter, the EC motor is electronically commutated in order to position the secondary part according to a setpoint signal of a higher order control or regulation device than the primary part, the absolute position value being tracked every time there is a change of the measured value combination. However, errors in the tracking of the absolute position value may occur in practice, for example, if the measuring signals of the magnetic field sensors are distorted by EMC (electromagnetic) irradiation. If the absolute position signal is incorrectly tracked due to an interference of this type, all additional absolute position values are shifted relative to the actual position. Therefore, electric motors that are mechanically commutated via brushes and equipped with an absolute position sensor have been used heretofore for applications in which a danger may be posed by an incorrect positioning of the secondary part relative to the primary part, such as in an electric motor for the automated actuation of a clutch disposed between a combustion engine and a mechanical manual transmission in a motor vehicle and/or in an electric motor for adjusting a shifting shaft in an automatic transmission of a motor vehicle. With an absolute value sensor of this type, the absolute position of the electric motor may be determined even after a reset of the electronic controller of the clutch or of the manual transmission without a reference run being necessary. Therefore, such a reset may occur largely unnoticed by the user of the motor vehicle, even during the operation of the motor vehicle, for example, if the power supply of the motor vehicle was temporarily disrupted or failed briefly because of a defect. However, absolute position sensors of this type are relatively expensive and extravagant.

BRIEF SUMMARY OF THE INVENTION

Therefore, the object of the present invention is to provide a method of the type mentioned at the outset that makes it possible to detect faults in the absolute position value detection in a simple manner.

This objective is achieved in that a reference sequence—which comprises a plurality of setpoint value combinations to be cycled through in succession, each of which has a number of setpoint values corresponding to the number of magnetic field sensors—is determined and stored in memory, that the setpoint value combination assigned to the absolute position value is determined based on the reference sequence of the measured value combination occurring at the reference position and the number of changes in the measured value combination that have occurred since the determined reference position was reached, that this setpoint value combination is compared to the measured value combination that was determined for the relevant absolute position value, and that a fault condition is detected when a deviation occurs between the setpoint value combination and the measured value combination.

The method is preferably carried out in the form of an operating program on a microcomputer. In this context it is even possible for the reference position to be stored in a non-volatile memory so that it is still available after a possible reset of the microcomputer. After a restart of the microcomputer, the memory may be read in order to determine the setpoint value combination assigned to the absolute position value and compare it to a measured value combination determined during or after the restart using the magnetic field sensor. If in this context it is determined that the setpoint value combination matches the measured value combination and the relative speed between the secondary part and the primary part was equal to zero both when the reset was triggered and after the reset, it may be assumed with greater probability that the secondary part has maintained its position relative to the primary part between the determination of the last absolute position value and the determination of the measured value combination, so that the absolute position value is still valid. In this case, a reference drive—which in an EC motor for actuating a clutch may result in the clutch being disengaged or in an EC motor for actuating a shifting shaft in a transmission may result in a positioning of the shifting shaft in the neutral position and thus an interruption in the pulling force—may be eliminated. In an EC motor provided for an application of this type, a reset of the microcomputer may thus be carried while the vehicle is traveling out without the user of the motor vehicle noticing it.

In a preferred embodiment of the invention, the absolute position value during each change in the measured value combination is increased by 1 when there is a forward movement of the secondary part and/or decreased by 1 when there is a reverse movement, an index being determined from the absolute position value and the number of stored setpoint value combinations with the aid of a modulo operation and the setpoint value combination assigned to the absolute position value being determined using the index and the measured value combination that occurs at the reference position. In this way, the setpoint value combination assigned to the absolute position value may be determined in a simple manner, for example, using a microcomputer.

It is advantageous if the reference position is run against anew after detection of the fault condition and the absolute position value at the reference position is set to the reference position value. In this context, the reference run may be carried out the same after the detection of a fault condition or at a later time. In an EC motor that is used to actuate a clutch or to shift a transmission in a motor vehicle, it is possible for the EC motor after detection of a fault condition to continue to operate at first in limp-home mode until the motor vehicle is in an operating state in which the reference run may be carried out largely unnoticed by the user of the motor vehicle.

In an advantageous embodiment of the invention, after detection of the fault condition, at least one first magnetic field sensor is determined whose measured values deviate from the corresponding setpoint values of the setpoint value combination, the absolute position value during the occurrence of a change in the measured values of the at least one second magnetic field sensor being tracked while taking into account the failure of the measured values of the at least one first magnetic field sensor in the event that the measured values of at least one second magnetic fields sensor match the setpoint values assigned thereto of the setpoint value combination. Therefore, the absolute position value may also be tracked using a number of measuring signals that is less than for normal operation. This may be achieved via determination of replacement values for the faulty measured values using the measured values that are recognized as correct and via tracking of the absolute position value using the replacement values. In this way it is possible to determine the absolute position even in the event of a failure of one or even more magnetic field sensors in order to continue to operate the EC motor, for example, in limp-home mode after the occurrence of a fault condition. In this context, a possible drop in the accuracy of the absolute position values is taken into account at least temporarily until the next reference run is carried out.

In an expedient embodiment of the invention, after detection of the fault condition, the number of magnetic field sensors is determined whose measured value(s) deviate(s) from the corresponding setpoint values of the setpoint value combination, the coil of the EC motor being activated to produce a traveling magnetic field having a prescribed control pattern that is independent of the measured value combination in the event that this number exceeds a prescribed value. Therefore, after a fault condition of this type is detected, the EC motor is operated like a stepper motor, it being assumed that the drive torque of the stepper motor is great enough that the steps that are output at the coil are also converted into a corresponding relative movement between secondary and primary part.

In a preferred embodiment of the invention, speed values for the relative speed between primary and secondary part are determined using the measured values of at least one magnetic field sensor and the time interval that these measured values have, the individual speed values being determined according to different measuring methods and the measuring methods to be used in each case being selected as a function of a speed value determined during an earlier speed value measurement. In this context, the measuring methods are preferably selected as a function of the relative speed between secondary part and primary part in such a manner that, at a low relative speed, a measuring method is used in which a relatively small delay time occurs during the determination of the speed values. At a high speed, a measuring method is preferably selected in which the speed values have a low noise or a small range of fluctuation.

Expediently, in at least one measuring method the speed values are determined using a fixed sampling rate from the measured values of the at least one magnetic field sensor, the increments being counted over the sampling period and the number then being divided by the sampling period. This measuring method is preferably used at low relative speeds between secondary and primary part. The evaluation may supply a signal even starting with the first increment.

It is advantageous, in at least one measuring method, if the time interval is determined between at least two instants at which a change of the measured value combinations occurs in the measuring sequence, if the distance the secondary part was moved relative to the primary part is determined using the absolute position values assigned to these instants, if a speed value for the relative speed between primary part and secondary part is determined from the time interval and the distance, and if the selection of the instants was preferably determined as a function of a speed value that was determined at an earlier speed measurement. In this context, the instants are preferably harmonized with the relative speed between secondary part and primary part in such a manner that at a low speed the absolute values are preferably determined with a relatively small delay time and at a high speed with low noise or a small fluctuation range.

It is advantageous if the selection of the instants on which the determination of speed values is based is determined as a function of the sizes of the position tolerances of the magnet segments, the tolerances in the dimensions and/or in the magnetization of the magnet segments. This way, it is possible, for example, that when there is a magnet segment whose position deviates from a desired position provided for the magnet segment, only the measured signal flanks assigned to each relevant magnet segment are evaluated so that the position tolerances do not affect the determined speed value.

In an expedient embodiment of the method, at a speed that falls below a prescribed limit value, the time interval is determined between changes of measured value combinations coming one right after the other, and, at a speed that is greater than or equal to the prescribed limit, the time interval is determined between changes of measured value combinations that are spaced apart in the measuring sequence. For this purpose, at a speed falling below the limit value, for example, the instants may be set within successive flanks of a signal that is formed via an exclusive-OR operation from the measuring signals of the individual magnetic fields sensors, while at a speed that is greater than or equal to the limit value, the instants are set within successive flanks of the measuring signal of one of the magnetic field sensors.

BRIEF DESCRIPTION OF THE DRAWINGS

Exemplary embodiments of the invention are explained in detail below in reference to the drawing. In the drawing:

FIG. 2 shows a table in which an exemplary plurality of absolute position values that are determined using magnetic field sensors and the microcomputer are listed, there being recorded there, in addition to the absolute position values, an index assigned to them, a setpoint value and measured value combination and a measured value combination, as well as a fault condition value derived from them;

FIG. 3 shows a reference sequence stored in the data memory of the microcomputer comprising six setpoint value combinations that are numbered with an index and have three setpoint values each;

DETAILED DESCRIPTION OF THE INVENTION

Figure 1:
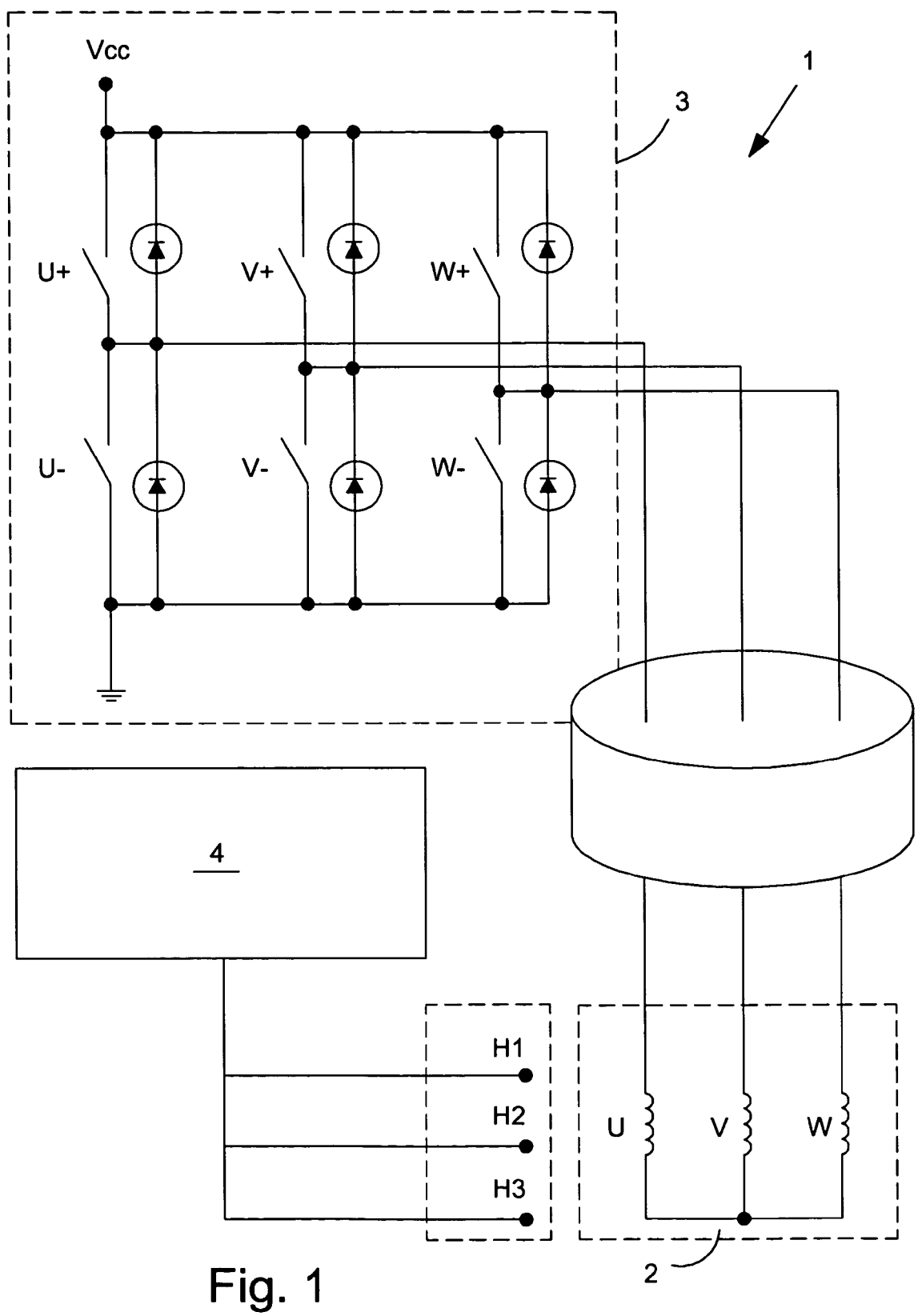
FIG. 1 shows a block diagram of an electric drive that has an EC motor, an output stage for driving the EC motor, magnetic field sensors for position determination of the EC motor rotor, and a microcomputer.

An electric drive 1 diagrammatically illustrated in the form of a block diagram in FIG. 1 has an EC motor 2 that is provided in a motor vehicle for engaging and disengaging a clutch that is disposed between a combustion engine and a mechanical manual transmission that is connected to the wheels of the vehicle. The clutch may be actuated either mechanically indirectly by EC motor 2 or via a hydraulic power transmission device driven by EC motor 2. The hydraulic power transmission device has a master cylinder that is in a driven connection with EC motor 2 and is connected to a slave cylinder via a hydraulic line. This engages at a mechanical actuator for the adjustment of the clutch. A transmission that effects an additional gear ratio may be disposed between the master cylinder or the mechanical component and the EC-motor. It is of significance that the position of the mechanical actuator is accurately adjustable within a very small travel range.

It is evident in FIG. 1 that the EC motor has a primary part designed as a coil and comprises a multiphase coil that is connected to the power supply of the motor vehicle via an output stage 3. The output stage has a plurality of semiconductor switches connected to a full-bridge converter that are driven by a microcomputer for the electronic commutation of the coil.

The primary part cooperates with a secondary part (not shown) of the EC motor 2, which is configured as a rotor that is rotatably mounted relative to the primary part and at its circumference has a sequence of permanently magnetized magnet segments that are alternately magnetized in opposite directions to each other.

On the primary part, a plurality of magnetic field sensors H1, H2, H3 is mounted in an offset arrangement in the circumferential direction, the sensors being configured as Hall sensors and detecting the magnetic field of at least one magnet segment in its detection range. Using magnetic field sensors H1, H2, H3, a measuring sequence having a plurality of measured value combinations is determined that are a function of the relative position between secondary part and primary part. In a rotary movement of the secondary part in a prescribed direction, the measuring sequence has a characteristic pattern that is prescribed by the number and arrangement of the magnet segments and the number and arrangement of the magnetic field sensors H1, H2, H3 and is run through cyclically in the relative movement and in a mechanical full rotation of the secondary part is repeated as often as the secondary part has a pole pair.

In the exemplary embodiment shown in FIG. 1, electric drive 1 has three magnetic field sensors H1, H2, H3 whose measuring signals may each take on the values "0" or "1". Using the measured values of the three magnetic field sensors, a maximum of eight different combinations 000, 001, 010, 011, 100, 101, 110 and 111 may be illustrated. The system of the magnet segments and magnetic field sensors H1, H2, H3 is selected in such a manner that combinations 000 and 111 normally do not occur when there is a relative movement between the secondary part and the primary part. Therefore, during a relative movement of the secondary part in a prescribed direction, six measured value combinations are run through cyclically. These combinations are determined, for example, in the construction of the EC motor and stored in a reference sequence memory. In FIG. 2, an exemplary embodiment of such a reference sequence is represented in the form of a table. It is clearly evident that the reference sequence has a sequence of six setpoint value combinations, each of which includes a number of setpoint values that corresponds to the number of magnetic fields sensors H1, H2, H3. In FIG. 2, a continuous index is assigned to each setpoint combination. In this context, the index "0" is assigned to the setpoint value combination that corresponds to the measured value combination occurring at the reference position.

To position the secondary part relative to the primary part, the coil of the EC motor is supplied with power in a known way as a function of the measured value combinations determined in each case. In this context, the coil produces a traveling magnetic field, which cooperates with the magnet segments in such a manner that the secondary part moves relative to the primary part.

The measuring signals of magnetic field sensors H1, H2, H3 are also used to determine the absolute position of the secondary part relative to the primary part. This is stored in a non-volatile position memory, for example, an EEPROM.

As is evident in FIG. 3, the EC motor first runs against a reference position whose absolute position is known. In the exemplary embodiment shown in FIG. 2, it has the value "0000". The reference position may be defined, for example, by a limit stop, against which one of the two clutch parts that are adjustable in relation to each other using the EC motor may be positioned in the disengaged position of the clutch. The reference run may be carried out, for example, during and/or after the combustion engine is started. As soon as the reference position has been reached, which is detected, for example, using a corresponding sensor, the position memory is set to the reference position value. Thereafter, during each change in the measured value combination, the absolute position value that is stored in the position memory is tracked, because the absolute position value is increased by 1 during a forward movement of the secondary part and/or decreased by 1 during a reverse movement. An index i is determined from the new absolute position value p determined in this way and the number n of memorized setpoint value combinations using the modulo operation indicated below:

$i = p \mod n.$

Using this index, the setpoint value combination assigned to the absolute position value is determined by reading the corresponding setpoint value combination from a storage position of the reference sequence memory that is assigned to the index. In FIG. 3, for the individual absolute position values, the index is entered in the second table column and the corresponding setpoint value combination is entered in the third column. The setpoint value combination determined in this way is compared to the measured value combination assigned to the absolute position value. When there is a deviation between the setpoint value combination and the measured value combination, a fault condition is detected and stored in a fault condition memory. In FIG. 3, the corresponding fault condition values are entered in last table column. In this context, the value "1" means that a fault was detected. Moreover, the microcomputer determines the relative speed between secondary and primary part from the absolute position values and deposits them in a non-volatile data memory.

In FIG. 3 it is evident that after reaching absolute position 2837, the microcomputer is reset. In this context, the EC motor is at a standstill before the reset. Such a reset may be required, for example, if, because of a disruption in the power supply of the motor vehicle, which cannot be completely excluded in practice, the operating voltage of the microcomputer falls below a prescribed minimum voltage value in such a way that an operating program running in the microcomputer may be disrupted. In order to prevent such a disturbance from resulting in an uncontrolled adjustment of the clutch of the vehicle, the microcomputer switches into a defined operating state by restarting. If during the reset and/or the subsequent restart of the secondary part, its position relative to the primary part changes, the absolute position value is nevertheless not tracked. In order to reduce the risk that as a result there is an error in the actuation of the clutch after the restart of the microcomputer, the measured value combination is redetermined after or during the restart and compared to the setpoint value combination assigned to the absolute position value. If the measured value combination matches the absolute position value and if the relative speed measured after the reset is still equal to zero, it is assumed that no relative movement between the secondary part and the primary part has taken place during and after the reset. The absolute position is then subsequently tracked at every change in the measured value combination starting from the absolute position value 2837 in the position memory.

In FIG. 3 it is evident that a second reset of the microcomputer is carried out at absolute position 6004. Also in this case, the EC motor is at a standstill immediately before the reset. However, during the reset the secondary part is moved relative to the primary part by an outside force. Clearly it is evident that, although absolute position value 6004 is still stored in the position memory after the reset, the measured value combination no longer matches the measured value combination that occurred immediately before the reset. In the comparison—carried out after the restart—of the measured value combination that is present then with the setpoint value combination assigned to the absolute position value, a deviation and thus a fault condition is detected. The fault condition is stored in the fault condition memory. Then a second reference run is carried out. As soon as the reference position is reached, the reference position value is written as a new absolute position value in the position memory. Thereafter, the absolute position value is in turn tracked at each change in the measured value combination.

The relative speed between the secondary part and primary part is determined using the measuring signals of magnetic field sensors H1, H2, H3. In this context, the determination of the relative speed is made according to different measuring methods. The measuring method used in each case is selected as a function of a speed value determined during an earlier speed measurement in such a manner that at a low relative speed a small delay time occurs during the determination of the speed values and at a high speed the speed values have a low noise or a low fluctuation range. If a corresponding speed value has still not been determined, the first speed value is determined using a prescribed measuring method.

In a first measuring method, the number of increments is counted throughout the sampling period at a fixed sampling rate and the number is then divided by the sampling period. In this measuring method, there is a maximum inaccuracy of one increment per sampling period. At a relative speed of 10 increments per scanning period, the inaccuracy is 10%. However, at only one increment per sampling period, the inaccuracy is already 100%. The evaluation may supply a signal even starting with the first increment. The first measuring method is preferably used at low relative speeds.

In a second measuring method for determining the relative speed, the time interval is determined between two instants at which there is a change of the measured value combinations in the measuring sequence. Using the absolute position values assigned to these instants, the distance that the secondary part was moved relative to the primary part between the instants is determined. From the time interval and the distance, a speed for the relative speed between primary part and secondary part is then determined. The selection of the instants was made in each case as a function of the speed value that was determined during the prior speed measurement.

Figure 4:
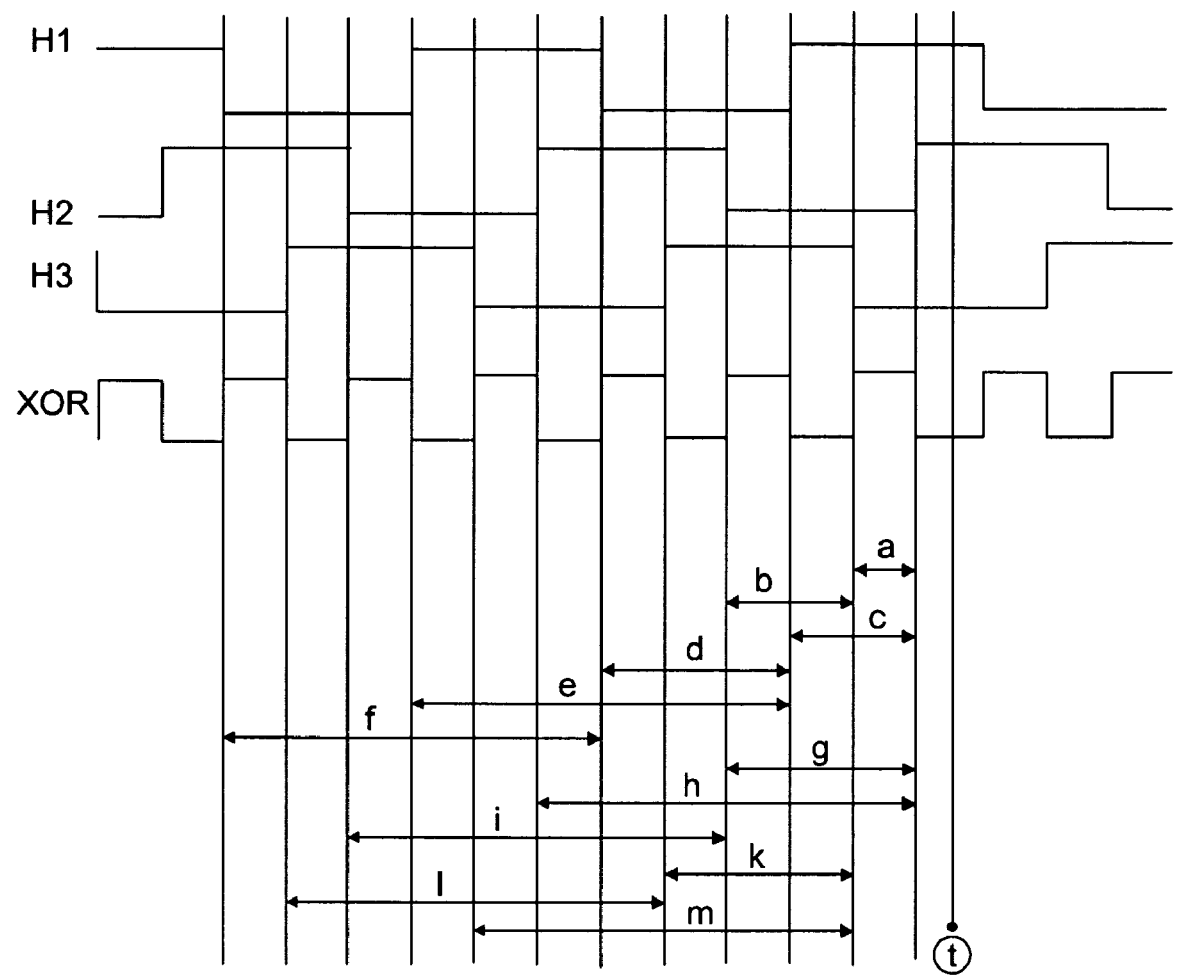
FIG. 4 shows a graphical representation of measuring signals of the individual magnetic field sensors and a signal that was formed via an exclusive-OR operation of the measuring signals, the time being plotted on the abscissa and the amplitude being plotted on the ordinate.

In the exemplary embodiment shown in FIG. 4, the instants between which the time interval is determined are arranged within rising and/or falling flanks of the magnetic fields sensor measuring signals, which are configured as square wave signals. The time at which the relative speed is to be measured is marked in FIG. 4 by the line labeled (t). When there are three magnetic fields measuring signals, each of which has rising and falling flanks, the following various possibilities result for the speed determination:

| Case | Sources for the determination of the relative speed |
|---|---|
| a | the last two flanks of the XOR signal |
| b | the last two rising flanks of the XOR signal |
| c | the last two falling flanks of the XOR signal |
| d | the last two flanks of the measuring signal of magnetic field sensor H1 |
| e | the last two rising flanks of the measuring signal of magnetic field sensor H1 |
| f | the last two falling flanks of the measuring signal of magnetic field sensor H1 |
| g | the last two flanks of the measuring signal of magnetic field sensor H2 |
| h | the last two rising flanks of the measuring signal of magnetic field sensor H2 |
| i | the last two falling flanks of the measuring signal of magnetic field sensor H2 |
| j | the last two flanks of the measuring signal of magnetic field sensor H3 |
| k | the last two rising flanks of the measuring signal of magnetic field sensor H3 |
| l | the last two falling flanks of the measuring signal of magnetic field sensor H3 |

In a time measurement over only a single increment or over a few increments, such as in cases a) to c) of the preceding table, a smaller delay time in the speed measurement occurs than in a time measurement over a greater number of increments. However, in a time measurement over only a single increment or over a few increments, tolerances in the positioning and/or the dimensions of the magnet segments have a stronger effect on the detected speed measured value than in a time measurement over a greater number of increments.

The following table shows how many increments are needed before the first speed value may be determined:

| Case | Measuring methods | Number of required increments |
|---|---|---|
| a | The last two flanks, XOR | 2 |
| b, c | The last two equal flanks, XOR | 3 (more favorable case), 4 (less favorable case) Always 3 if both flanks are evaluated |
| d, g, k | The last two flanks of a sensor | 4 (more favorable case), 6 (less favorable case) |
| e, f, h, i, l, m | The last two equal flanks of a sensor | 7 (more favorable case), 12 (less favorable case) |
| (d) | The last two flanks of the last sensor | 4 |
| (f) | The last two equal flanks of the last sensor | 7 (more favorable case), 8 (less favorable case) Always 7 if both flanks are evaluated |

Figure 5:
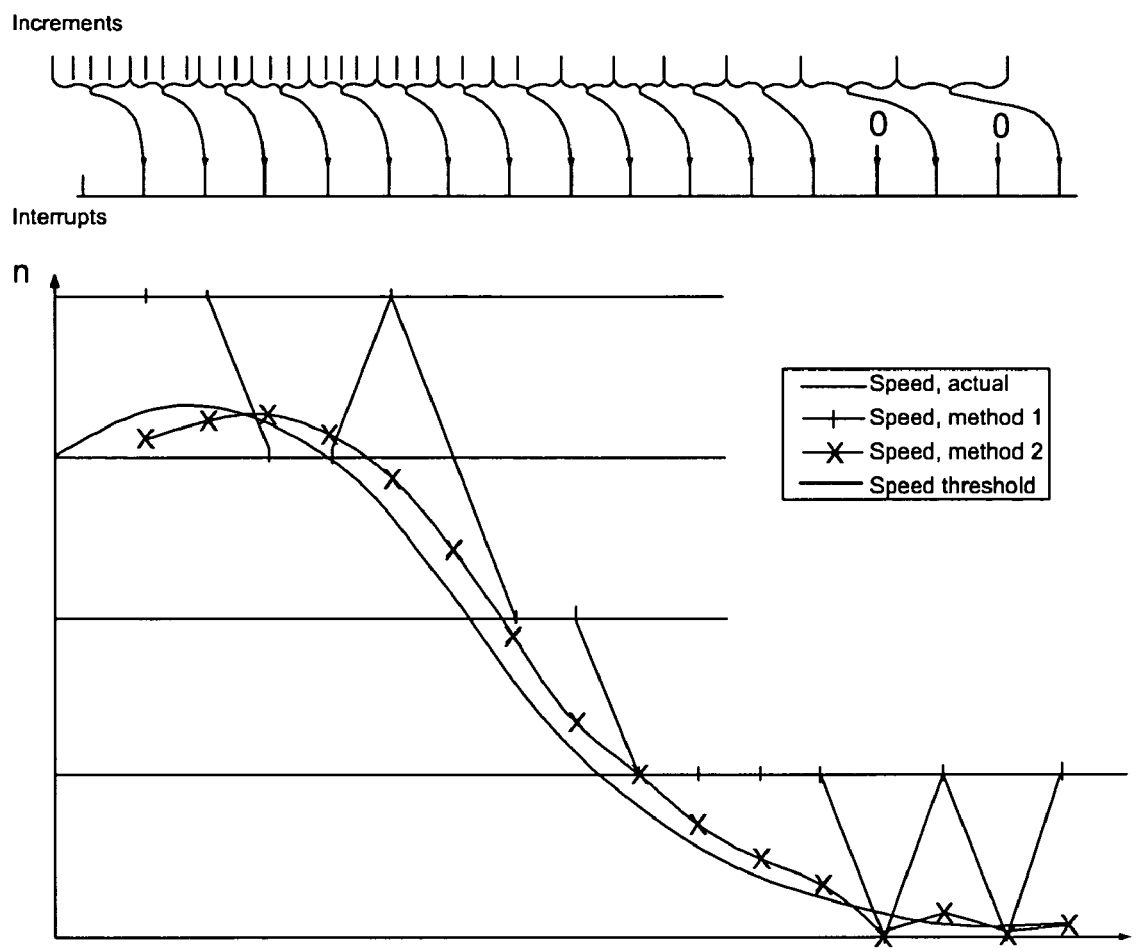
FIG. 5 shows a graphical representation of the actual speed signal of an EC motor and two speed signals determined according to different methods, the time being plotted on the abscissa and the speed being plotted on the ordinate.

In FIG. 5, the relative speed signals determined according to the two measuring methods and the actual relative speed are graphically illustrated. It is clearly evident that the relative speed signal determined according to measuring method 1 has a greater roughness than the relative speed signal determined according to measuring method 2. Moreover, it is evident that the relative speed signal determined according to measuring method 2 has a phase shift in relation to the actual relative speed.

In measuring methods 1 and 2 there is in each case a bottom threshold for the measurable relative speed. In measuring method 1 this threshold is at an increment per sampling period and in measuring method 2, the threshold is a function of the selected time interval. If the relative speed is below this threshold, every evaluation does not yield a speed value that is greater than zero. Therefore, if the measured relative speed is equal to zero, this does not necessarily mean that the EC motor no longer moves.

In the first and second measuring methods, there is in each case a bottom threshold for measurable relative speed. This threshold value in the first method is at one increment per measuring period. In the two methods, the threshold value is a function of the selected measuring length. If the relative speed is below the threshold, not every evaluation yields a result. Sometimes, the value 1 is determined for the relative speed and sometimes the value 0. However, the relative speed value 0 does not necessarily mean that the secondary part no longer moves relative to the primary part.

If the secondary part of EC motor 2 moves at a constant speed below the threshold and the value 0 is determined for the relative speed, it would be best to maintain the last speed value that was not equal to 0. However, in the event that the EC motor comes to a standstill, it would be better to immediately jump the measured relative speed to 0.

In order to improve the aforementioned measuring accuracy at low relative speeds, the relative speed values may be filtered, for example, by determining the average value from the two last unfiltered relative speed values and/or the average value from the last filtered relative speed value and the last unfiltered relative speed value. In this context, the first filter method mentioned is preferred because the relative speed signal determined according to this method has a lower noise than the relative speed signal determined according to the last filter method mentioned. Moreover, in the first filter method mentioned, the filtered relative speed signal reaches the value zero faster if the EC motor is stopped.

In practice, the magnet segments have position tolerances and tolerances of their dimension and their magnetization. Magnetic field sensors H1, H2, H3 may also have position tolerances. The tolerances may lead to the determined speed values deviating from the actual relative speed between secondary part and primary part. In this context, the deviation is a function of the measuring method with which the speed values are determined.

Figure 6:
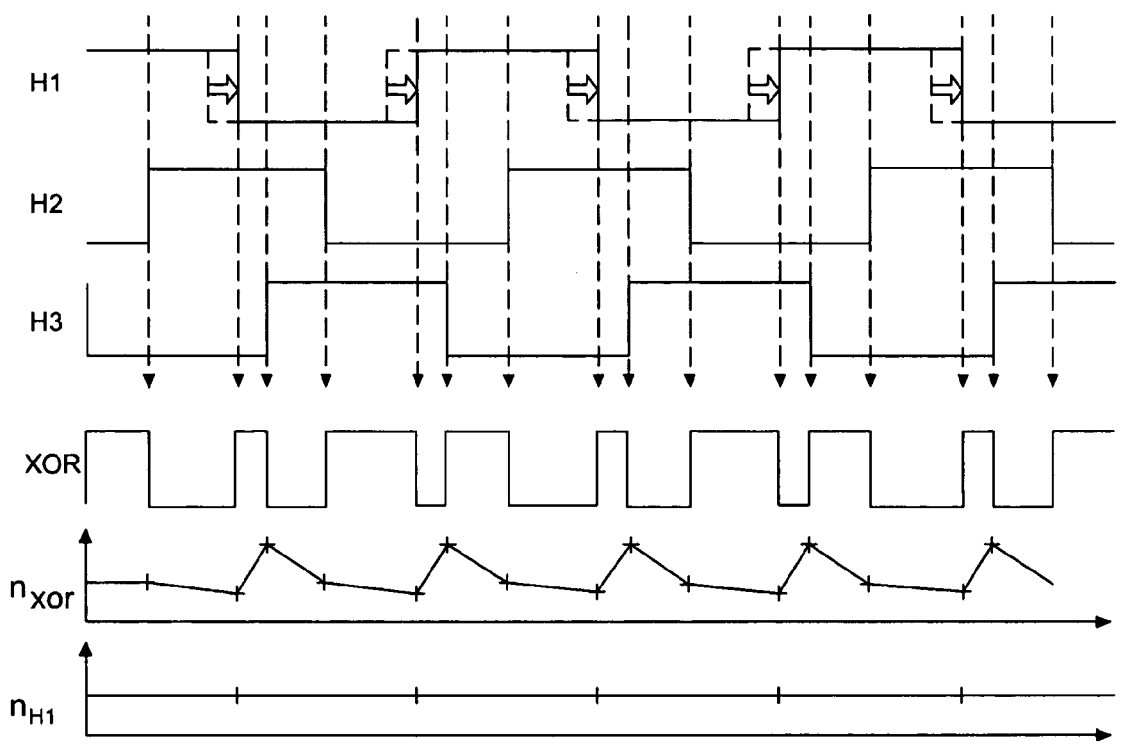
FIG. 6 shows a graphical illustration of measuring signals, similar to FIG. 4, the measuring signal of sensor H1 being moved in relation to a desired position, the signal designated XOR having been formed by exclusive-OR operation of the measuring signals, $n_{XOR}$ being a speed or rotary speed signal derived therefrom, and $n_{H1}$ representing a speed or rotary speed signal derived from the measuring signal of sensor H1.

For an EC motor 2 in which magnetic field sensor H1 is inexactly positioned, the measuring signals of magnetic field sensors H1, H2, H3 are illustrated in FIG. 6. It is clearly evident that, because of the inexact positioning of the magnetic field sensor H1, its measuring signal is shifted to the right in relation to the desired position. In FIG. 6, this is indicated by arrows. In FIG. 6, it is further evident that the measuring signals of magnetic field sensors H1, H2, H3 are operated as exclusive-OR. The corresponding exclusive-OR signal is labeled XOR. Because of the inexact positioning of magnetic field sensor H1, the pulses, on the one hand, but also the pulse pauses, on the other hand, have different widths. If the speed signal is determined via determination of the time period between the occurrence of two successive flanks of the XOR signal and is divided by the distance that corresponds to the reference distance by which the magnet segments are to be offset in relation to each other for flawless positioning, fluctuations in the speed signal are produced. The corresponding speed signal is labeled $n_{XOR}$ in FIG. 6. This inaccuracy may be prevented via determination of the speed signal by only one magnetic field sensor. The speed signal determined in this way is labeled $n_{H1}$ in FIG. 6.

Figure 7:
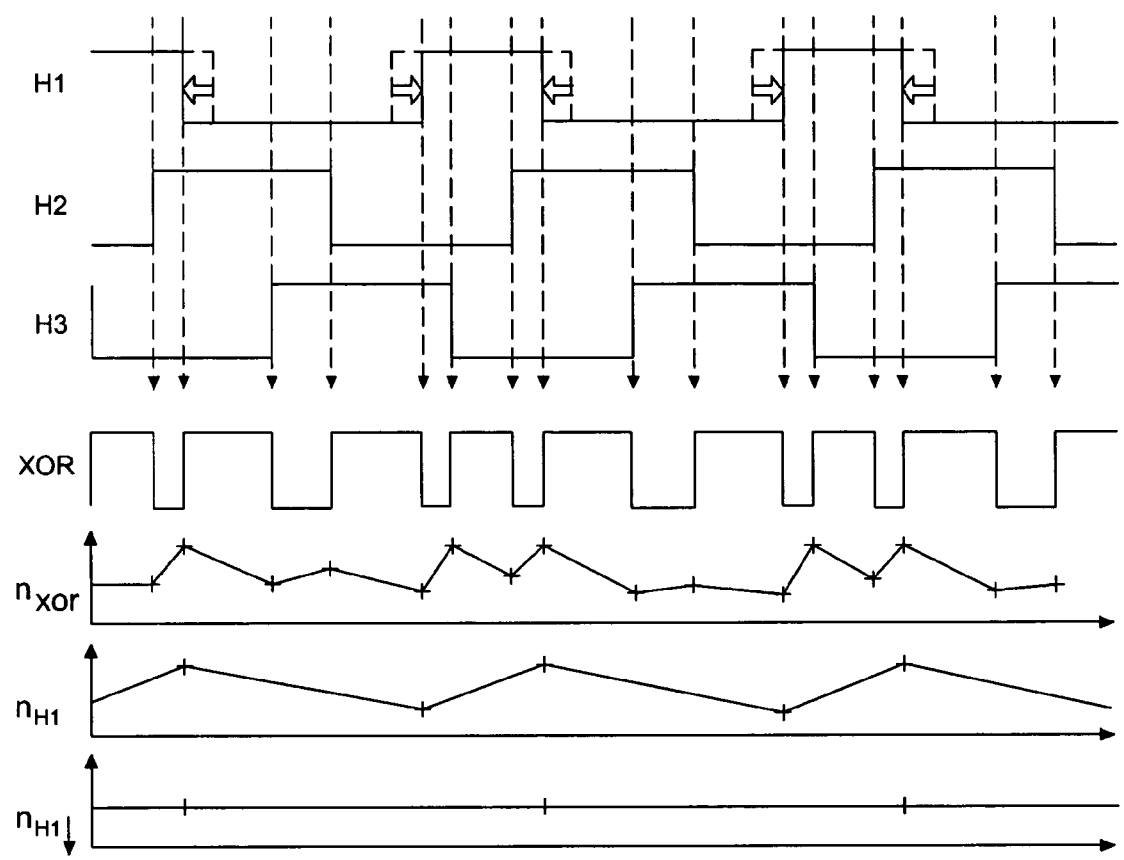
FIG. 7 shows a graphical representation of measuring signals, similar to FIG. 6, the width of the pulses of the measuring signal of sensor H1 deviating from a setpoint value, $n_{H1}$ signifying a speed or rotary speed signal derived by evaluating the distance of two flanks pointing in opposite directions, and $n_{H1\downarrow}$ signifying a speed or rotary speed signal derived by evaluating the distance of two flanks pointing in the same direction; and, FIG. 8 shows a graphical illustration of measuring signals, similar to FIG. 7, but where only the width of a pulse—of the measuring signal of sensor H1—that is assigned to a specific magnet segment deviates from the setpoint value.

For an EC motor 2 in which magnetic field sensor H1 is incorrectly calibrated and/or has too large a distance from the magnet segments, the measuring signals of magnetic field sensors H1, H2, H3 are illustrated in FIG. 7. It is clearly evident that the pulses of magnetic field sensor H1 have too small a width and the pulse pauses have too large a width. As a result, fluctuations in the pulse width and the duration of the pulse pauses also result for the XOR signal. Speed signals XOR and $n_{H1}$ therefore fluctuate accordingly, the fluctuations for speed signal XOR being greater than for speed signal $n_{H1}$. These inaccuracies may be prevented by the determination of the speed signal only using the same magnetic field sensor having flanks pointing in this direction. The speed signal determined in this way is labeled $n_{H1\downarrow}$ in FIG. 7.

Figure 8:
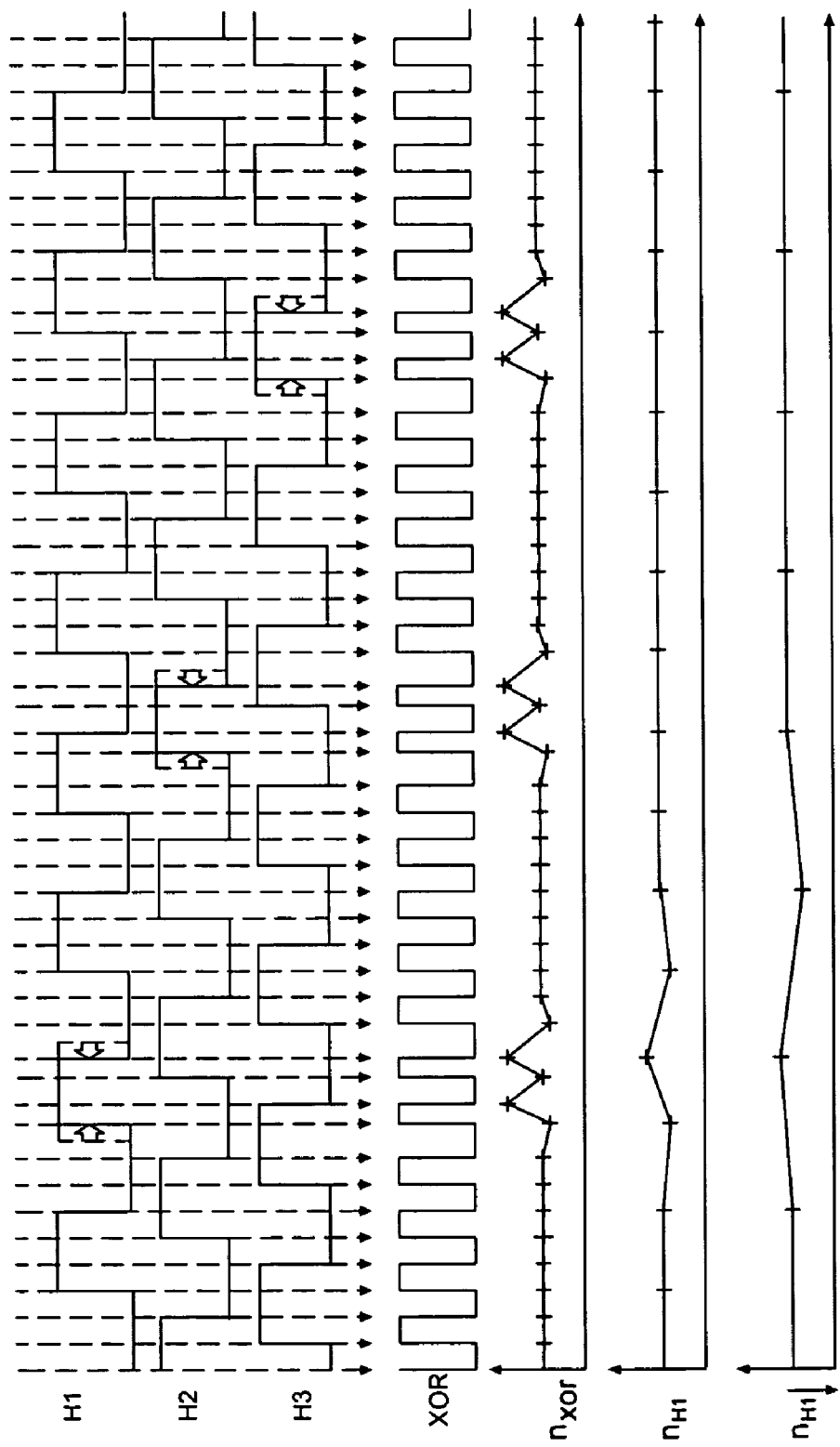

For an EC motor 2 in which a magnet segment is too weakly magnetized, the measuring signals of magnetic field sensors H1, H2, H3 are illustrated in FIG. 8. Clearly it is evident that in each of the measuring signals for each passage of the too-weakly-magnetized magnet segment too narrow a pulse occurs on the corresponding magnetic field sensor, which leads to errors in the speed signals $N_{XOR}$, $n_{H1}$ und $n_{H1\downarrow}$. In this context, the errors of speed signal $n_{H1\downarrow}$ are substantially smaller than those of speed signal $n_{XOR}$.

The speed values are cyclically requested by a controller within a prescribed time grid. The controller may have a microcomputer in which an interrupt is triggered after a prescribed time period in order to determine a speed value. As a function of the number of magnetic field sensor measuring signals, the position and/or calibration tolerances of magnetic fields sensors H1, H2, H3 and the individual tolerances that the magnet segments detected during the measuring period have regarding their positioning, their dimensions and their magnetization, the measuring method that yields the smallest error in the determination of the speed values is the one that is selected. The speed value for the relevant measuring period is then determined using this measuring method.

In starting off after startup or after a longer stoppage of the EC motor 2, it is important to keep the delay in the speed measurement as small as possible. This is achieved by determination of a speed value using the first available pulses. If less than three increments have occurred during the sampling period, the last two flanks of the XOR signal are used for the determination of the speed value. If between 3 and 6 increments have been counted during the sampling period, the last three increments (=number of magnetic field sensors) are used to determine the speed value. In this context, both flanks of the same sensor are evaluated. If more than six increments occur during the sampling period, the last n×6 increments are used for the determination of the speed value, n being an integer value. In this case, the same flank of the last sensor is always used.

LIST OF REFERENCE CHARACTERS

1 Electric drive
2 EC motor
3 Output stage
4 Microcomputer
H1 First magnetic field sensor
H2 Second magnetic field sensor
H3 Third magnetic field sensor

What is claimed is:

1. A method for operating an EC motor (2) which has a primary part having a coil and a secondary part having magnet segments that are magnetized in directions opposite one another, a measuring sequence being determined that has a plurality of measured value combinations that are a function of the relative position between secondary part and primary part and each include a number of measured values that correspond to the number of magnetic fields sensors (H1, H2, H3) used for the determination that are mounted on the primary part and cooperate with the magnet segments, and the coil being supplied current as a function of the measured value combinations in such a manner that the secondary part moves relative to the primary part, the absolute position of the secondary part relative to the primary part being determined via positioning of the secondary part at a reference position, and an absolute value being tracked, starting from a reference position value, at each change of the measured value combination, wherein a reference sequence—which comprises a plurality of setpoint value combinations to be cycled through in succession, each of which has a number of setpoint values corresponding to the number of magnetic field sensors (H1, H2, H3)—is determined and stored in memory, the setpoint value combination assigned to the absolute position value is determined based on the reference sequence of the measured value combination occurring at the reference position and the number of changes in the measured value combination that have occurred since the determined reference position was reached, this setpoint value combination is compared to the measured value combination determined for the relevant absolute position value, and a fault condition is detected when a deviation occurs between the setpoint value combination and the measured value combination.

2. The method as described in claim 1, wherein the absolute position value during each change in the measured value combination is increased by 1 when there is a forward movement of the secondary part and/or decreased by 1 when there is a reverse movement, an index is determined from the absolute position value and the number of stored setpoint value combinations with the aid of a modulo operation and the setpoint value combination assigned to the absolute position value is determined using the index and the measured value combination that occurs at the reference position.

3. The method as described in claim 1, wherein, after detection of the fault condition, the reference position is run against anew and the absolute position value at the reference position is set to the reference position value.

4. The method as described in claim 1, wherein, after detection of the fault condition, at least one first magnetic field sensor (H1, H2, H3) is determined whose measured values deviate from the corresponding reference values of the reference value combination, and in the event that the measured values of at least one second magnetic field sensor (H1, H2, H3) match the setpoint values assigned to it of the setpoint value combination, the absolute position value is tracked when a change occurs in the measured values of the at least one second magnetic field sensor (H1, H2, H3) taking into consideration the failure of the measured values of the at least one first magnetic field sensor (H1, H2, H3).

5. The method as described in claim 1, wherein, after detection of the fault condition, the number of magnetic field sensors (H1, H2, H3) is determined whose measured value(s) deviate(s) from the corresponding setpoint values of the setpoint value combination, and in the event that this number exceeds a prescribed value, the coil of the EC motor (2) is activated to produce a traveling magnetic field having a prescribed control pattern that is independent of the measured value combination.

6. The method as described in claim 1, wherein speed values for the relative speed between primary and secondary part are determined using the measured values of at least one magnetic field sensor (H1, H2, H3) and the time interval that these measured values have, the individual speed values are determined according to different measuring methods and the measuring methods to be used in each case are selected as a function of a speed value determined during an earlier speed value measurement.

7. The method as described in claim 6, wherein, in at least one measuring method, the speed values are determined using a fixed sampling rate from the measured values of the at least one magnetic field sensor (H1, H2, H3), the increments being counted over the sampling period and the number then being divided by the sampling period.

8. The method as described in claim 6, wherein, in at least one measuring method, the time interval is determined between at least two instants at which a change of the measured value combinations occurs in the measuring sequence, the distance the secondary part was moved relative to the primary part is determined using the absolute position values assigned to these instants, a speed value for the relative speed between primary part and secondary part is determined from the time interval and the distance, and the selection of the instants was preferably determined as a function of a speed value that was determined at an earlier speed measurement.

9. The method as described in claim 8, wherein the selection of the instants on which the determination of speed values is based is determined as a function of the sizes of the position tolerances of the magnet segments, the tolerances in the dimensions and/or in the magnetization of the magnet segments.

10. The method as described in claim 8, wherein, at a speed that falls below a prescribed limit value, the time interval is determined between changes of measured value combinations coming one right after the other, and, at a speed that is greater than or equal to the prescribed limit, the time interval is determined between changes of measured value combinations that are spaced apart in the measuring sequence.

11. The method as described in claim 8, wherein the instants are selected in such a manner that they are within flanks of the measuring signal of at least one magnetic field sensor (H1, H2, H3) that follow each other in direct succession, are rising, falling and/or oriented in opposite directions from one another.

* * * * *